(12) United States Patent
Gao et al.

(10) Patent No.: US 7,831,145 B2
(45) Date of Patent: Nov. 9, 2010

(54) PASSIVE OPTICAL NETWORK SYSTEM AND METHOD FOR PROTECTING THE SERVICES OF THE SAME

(75) Inventors: Hai Gao, Shenzhen (CN); Gang Zheng, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 852 days.

(21) Appl. No.: 11/611,382

(22) Filed: Dec. 15, 2006

(65) Prior Publication Data
US 2007/0217788 A1 Sep. 20, 2007

(30) Foreign Application Priority Data
Mar. 15, 2006 (CN) .................... 2006 1 0034310

(51) Int. Cl.
*G02F 1/00* (2006.01)
(52) U.S. Cl. .............. 398/5; 398/3; 398/1; 398/2; 398/8; 398/100; 398/98; 398/99; 398/72; 398/69; 370/468; 370/442; 370/401; 370/389; 370/352; 725/105; 725/106; 725/125; 725/127; 725/129
(58) Field of Classification Search .............. 398/5, 398/1, 2, 3, 4, 7, 8, 10, 13, 17, 20, 22, 23, 398/24, 33, 59, 66, 67, 68, 69, 79, 45, 46, 398/47, 48, 49, 50, 51, 52, 56, 57, 58, 98, 398/99, 100, 135; 370/217, 401, 468, 252, 370/442, 503, 389, 465, 352, 392; 725/105, 725/106, 125, 127, 129, 121
See application file for complete search history.

(56) References Cited
U.S. PATENT DOCUMENTS
5,680,546 A 10/1997 Chiaretti et al.
(Continued)

FOREIGN PATENT DOCUMENTS
EP 1041852 A2 10/2000
(Continued)

OTHER PUBLICATIONS
Tsan-Jim Chan, A self-protected architecture for wavelength-division-multiplexed passive optical networks, Nov. 2003, IEEE Photonics Technology Letters, vol. 15, No. 11, pp. 1660-1662.*
(Continued)

*Primary Examiner*—Hanh Phan
(74) *Attorney, Agent, or Firm*—Conley Rose, P.C.; Grant Rodolph

(57) ABSTRACT

The present disclosure provides a passive optical network (PON) system and a method for protecting the service of the system for service recovery and fault locating in case of a failure of the network, wherein the PON system comprises an optical line terminal (OLT), an optical distribution network (ODN) and an optical network terminal (ONT) equipment protection group comprising a plurality of ONT equipment groups, each of which is connected to at least one of other ONT equipment groups within the ONT equipment protection group for the mutual protection relationship. The PON system of the present disclosure does not require equipment and link redundancy for backup, contributes to reduced cost and improved utilization of resources, and provides a means for diagnosing any faults of the links and equipment in the network.

20 Claims, 3 Drawing Sheets

U.S. PATENT DOCUMENTS

| | | | |
|---|---|---|---|
| 6,288,806 B1 * | 9/2001 | Touma et al. | 398/5 |
| 6,975,586 B1 * | 12/2005 | Yoshimura | 370/217 |
| 7,359,637 B2 * | 4/2008 | Kim et al. | 398/72 |
| 7,412,169 B2 * | 8/2008 | Joo et al. | 398/72 |
| 2006/0083253 A1 * | 4/2006 | Park et al. | 370/401 |

FOREIGN PATENT DOCUMENTS

| | | | |
|---|---|---|---|
| EP | 1548965 A2 | 6/2005 | |
| GB | 2330280 A | 4/1999 | |

OTHER PUBLICATIONS

European Search Report; EP Application No. 07005172; Jul. 2, 2007; 3 pgs.

Foreign communication from a related counterpart application—European application 07005172.7, office action dated Sep. 18, 2008, 4 pages.

Foreign communication from a related counterpart application—European application 07005172.7, office action dated Nov. 11, 2009, 4 pages.

Foreign communication from a related counterpart application—Chinese application 2006100343100, office action dated Jul. 17, 2009, 6 pages.

Foreign communication from a related counterpart application—English Translation of Chinese application 2006100343100, office action dated Jul. 17, 2009, 7 pages.

"Information Technology—Telecommunications and Information Exchange Between Systems—Local and Metropolitan Area Networks—Specific Requirements—Part 3: Carries Sense Multiple Access with Collision Detection (DSMA/CD) Access Method and Physical Layer Specifications—Introduction to Ethernet for Subscriber Access Networks," IEEE Standard 802.3, dated 2005, 417 pages.

"Information Technology—Telecommunications and Information Exchange Between Systems—Local and Metropolitan Area Networks—Specific Requirements—Part 3: Carries Sense Multiple Access with Collision Detection (DSMA/CD) Access Method and Physical Layer Specifications—Introduction to Ethernet for Subscriber Access Networks," Chinese Translation IEEE Standard 802.3, dated 2005, 129 pages.

* cited by examiner

PASSIVE OPTICAL NETWORK SYSTEM AND METHOD FOR PROTECTING THE SERVICES OF THE SAME

CROSS-REFERENCE TO RELATED APPLICATIONS

This application is claiming priority of Chinese Application No. 200610034310.0 filed Mar. 15, 2006, entitled "Passive Optical Network System and Method for Protecting the Services of the Same" which application is incorporated by reference herein in its entirety.

BACKGROUND OF THE DISCLOSURE

The present disclosure relates generally to the optical network field, and more particularly to a PON system and method for protecting its services.

A Passive Optical Network, or PON, is an optical fiber cabling network accessed by a user in which the central part contains no active electronic devices and all of the user signals converge going upstream and are broadcast going downstream using only passive components, such as optical dividers. Passive optical network technology is a broadband access technology that has great competitive advantages and is an important technical means that offers user access over the "the last mile". By using passive optical components in its optical distribution network (ODN) and optical fiber as the medium for transmission, the technology has the advantages of high bandwidth, high immunity to electromagnetic interference, low loss, low cost, and simple design. In recent years, various PON technologies have gradually become commercially available.

Referring to FIG. 1, most existing optical network systems adopt a tree topology. User services access the network through an optical network unit (ONU) or an optical network terminal (ONT), are pooled on the ODN, and are ultimately sent to an optical line terminal (OLT). However, a pure tree topology does not have measures for failure protection and recovery or means for locating a failure. If an equipment or link fault is not corrected for a long time, the user services may be greatly affected and security may be seriously impaired. It is also very difficult to locate the fault. Therefore, the security of the PON is an issue of great importance and the PON must be capable of protecting its services in the event that it has a fault.

The existing PON systems achieve service protection by means of fully-protected optical fiber switchover, as shown in FIG. 2. In such a system, there are two links between the OLT and the ODN, and between the ONU and each ONU/ONT, where one link serves as redundancy backup to ensure a quick recovery of services in case of a fault.

However, the existing failure protection measures achieve unobstructed network traffic and normal services by adding a large number of redundant equipment and have the following defects:

1. High construction cost. Each ONU requires two sets of identical transmission equipment requires an additional optical interface, which results in a dramatic increase in the ONU cost.
2. Low bandwidth utilization. Only one of the two work channels is working while the other one is always idle, resulting in an increased waste of resources.
3. Inability to locate a fault and indicate fault type.

SUMMARY

The embodiment of the present disclosure provides a PON system and a service protection method that is capable of service protection and fault diagnosis when a link or equipment fault occurs in the PON system. The PON system and service protection method have reduced construction cost and improved bandwidth utilization.

According to an embodiment of the present disclosure, a PON system is provided, which comprises an OLT connected to an ODN for processing user service data and for managing and controlling the ODN and the ONT equipment groups; an ODN, which is connected to the OLT equipment group and equipment within the ONT equipment groups, for collecting user service data received from the ONT equipment groups and for transmitting user services data to the OLT equipment group. The PON system further comprises an ONT equipment protection group connected to the ODN for protecting the services of the ONT equipment group within the ONT equipment protection group and transmitting the received user service data to the ODN.

According to an embodiment of the present disclosure, a PON system service protection method is provided, which comprises the steps of:

determining an optical network terminal (ONT) equipment protection group that comprises a plurality of ONT equipment groups, each of which is connected to another ONT equipment group within the ONT equipment protection group via a backup link for the mutual protection relationship;

sending a fault alert by the OLT, upon detecting a failed ONT equipment group, to the ONT equipment group that has the mutual protection relationship with the failed ONT equipment group; and receiving services for the failed ONT equipment group by the ONT equipment that has the mutual protection relationship with the failed ONT equipment group upon receiving the fault alert.

Compared with the prior art, the embodiments of the present disclosure have the following effects:

1. One backup link is added between any two equipment without the need to add redundant equipment, thereby improving network security while greatly reducing the construction cost.
2. A backup link is added between any two equipment without an additional redundant service channel, thereby avoiding resource waste and improving bandwidth utilization.
3. An embodiment of the present disclosure also provides a means for diagnosing link faults and equipment faults in the PON.

DETAILED DESCRIPTION

The preferred embodiments of the present disclosure are described in details below in conjunction with drawings.

Figure 1:
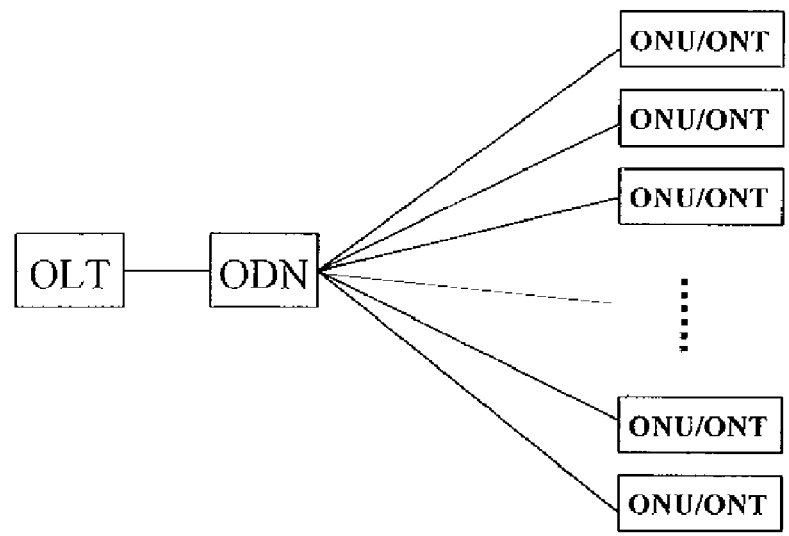
FIG. 1 is a drawing illustrating one embodiment of the tree topology architecture of the PON.
Figure 2:
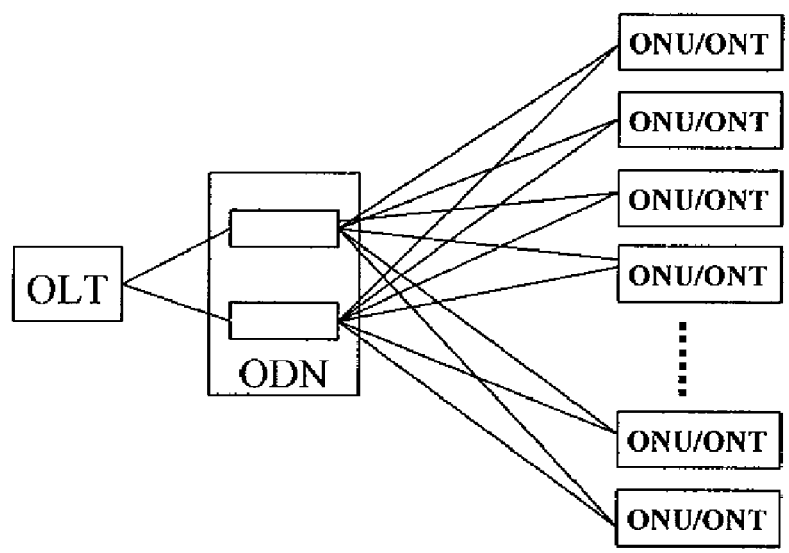
FIG. 2 is a schematic drawing illustrating one embodiment of how the fully-protected optical fiber switchover is performed in the PON.
Figure 3:
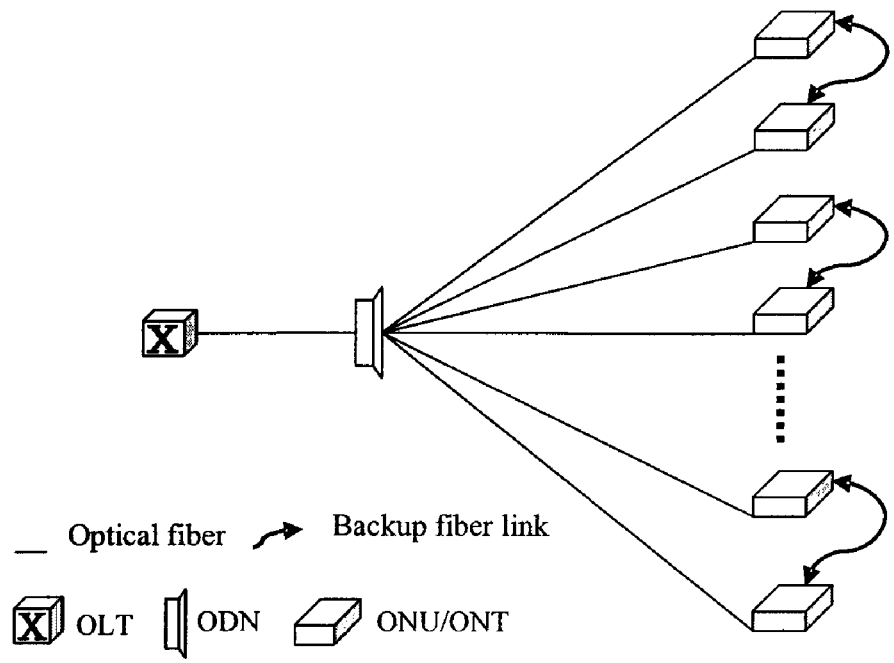
FIG. 3 is a schematic drawing illustrating the networking of the PON system of an embodiment of the present disclosure.

FIG. 3 is a schematic drawing showing the networking of the PON system of an embodiment of the present disclosure, in which the ONU/ONT equipment is connected to the ODN equipment via an optical fiber and the ODN equipment is connected to the OLT equipment via an optical fiber. The user service data is connected via the ONU/ONT, gathered on the ODN, and is then sent to the OLT for further processing. The ONU/ONT equipment that needs protection is grouped into a protection group, and the pieces of equipment within this group are interconnected to each other via a backup link. In this embodiment, two pieces of equipment are grouped into a protection group, and the two pieces of equipment within the protection group are interconnected via a backup link to form a mutual protection relationship, where the protection group details are recorded in the OLT.

The following describes how the device of the present disclosure achieves service protection and fault locating in the event of a failure of the PON.

Figure 4:
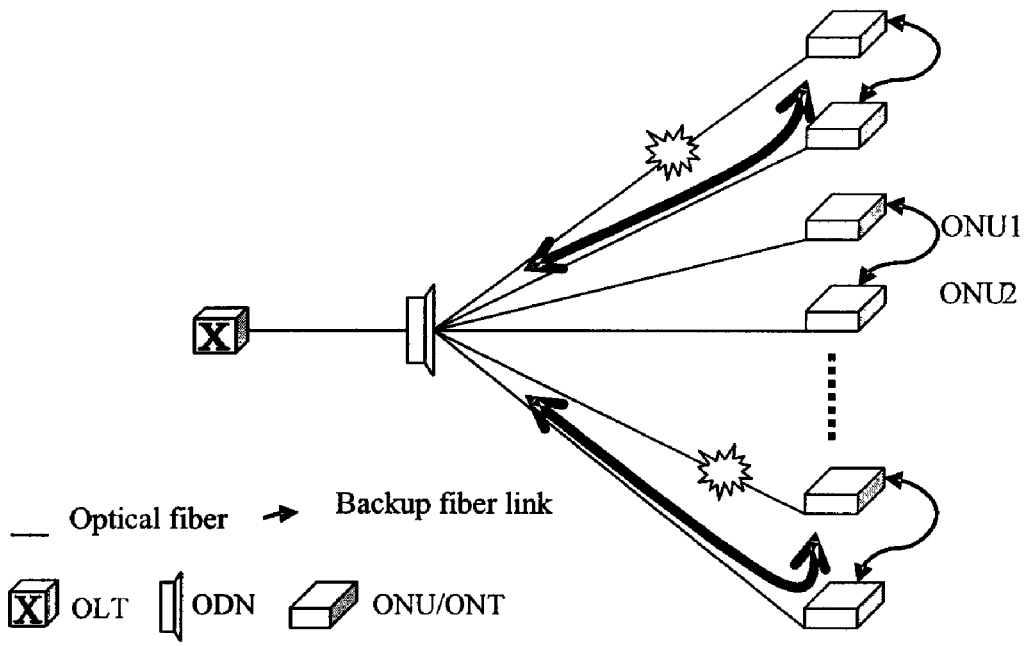
FIG. 4 is a schematic drawing illustrating the PON system service protection strategy of an embodiment of the present disclosure.

As shown in FIG. 4, ONU1 and ONU2 periodically check each other's state via the backup link and send the state report to the OLT after the check. When the optical fiber linking ONU1 and the ODN is broken, or when the PON interface module connecting ONU1 and the ODN fails, ONU1 detects a disruption in its connection with the OLT, initiates the fault recovery mechanism, communicates its failure to ONU2 through the regular checking mechanism, and requests ONU2 to receive its data transmission work. At the same time, the OLT also detects the disconnection with ONU1 and alerts ONU1's backup partner, ONU2, to receive the data transmission work for ONU1. Upon receiving the alert from the OLT, ONU2 agrees to receive the work for ONU1, and ONU1 sends the service data via the backup link to ONU2, which in turn sends the data to the ODN. In this manner, the services of ONU1 are resumed.

When there is a power outage fault in ONU1, a disruption in the backup link, or a system failure, the OLT detects the disconnection of ONU1 and immediately alerts ONU2 to give ONU1 a fault diagnosis via the backup link. ONU2 first determines whether the backup link is normal, and if not, ONU2 determines that the cause of the fault is an ONU1 power outage or a backup link disruption. If the backup link is normal and ONU2 is unable to receive the regular query message from ONU1, it is determined that the fault is an ONU1 system fault, which requires diagnosis and troubleshooting from operators.

Figure 5:
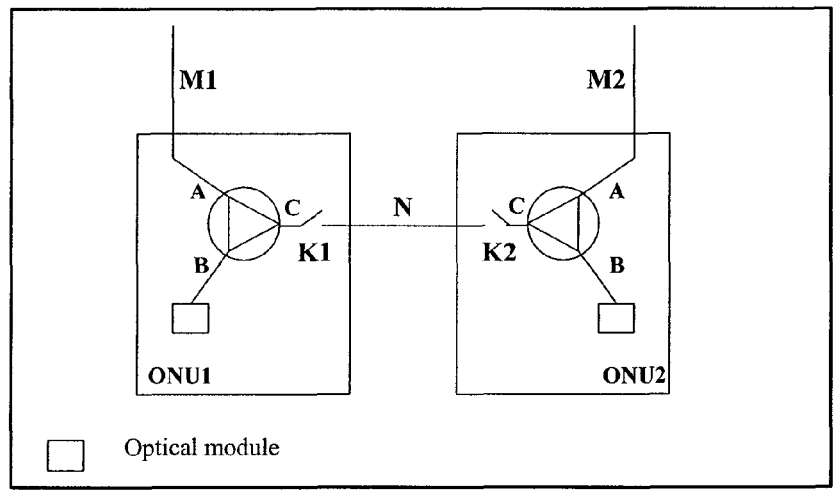
FIG. 5 is a block diagram illustrating the service port switching module of an embodiment of the present disclosure in which the backup link between ONUs is an optical fiber link.

The method for implementing service protection when a fiber disconnection occurs between ONU1 and the ODN or a failure of the PON interface module connecting ONU1 and the ODN occurs may vary depending on the backup link:

When the backup link is an optical fiber link:

In this case, the ONU internally adopts a service port switching module, as shown in FIG. 5. The circular ring containing a triangle as shown is preliminarily called an optical divider. The optical divider has the following function: any incoming optical signal to any one of the three interfaces A, B and C, is allowed to exit from the other two interfaces and remains undistorted for the life of the effective wavelength window except for a slight loss of optical power. The module may be an integrated optical component or may be formed by combining three 1:2 optical dividers. When each of the three 1:2 optical dividers is interconnected with the other two in the pattern of the triangle contained in the circle shown, an incoming optical signal to interface A may be divided into two signals and exits from interfaces B and C. Similarly, an optical signal coming into interfaces B or C may exit from interfaces A and C or A and B.

The module further includes an optical switch K1/K2, which controls the connection/disconnection of the optical path based on the electric signal applied. When there is a disruption in the branch fiber M1 connecting ONU1 and the OLT, ONU1 detects the disrupted connection with the OLT and initiates the fault recovery mechanism, wherein ONU1 closes the optical switch K1 and the optical signal sent from the optical module is transferred to ONU2 via the backup link N. Upon detecting the disconnection of ONU1 and determining that the ONU1's backup partner is ONU2 by looking this information up in its own database, the OLT alerts ONU2 to initiate the fault recovery mechanism, and ONU2 closes its own optical switch K2 upon receiving the alert. When both ONU1 and ONU2 close their respective optical switches K1 and K2, ONU1 will be able to log onto the PON again via the ONU2's optical fiber M2 and thereby resume its services.

Referring to FIG. 5, now ONU1 and ONU2 can be seen as two PON terminals connected to a 1:2 optical divider and the physical link from ONU1 to the OLT is basically the same as the original one. Therefore, fault recovery is achieved without requiring ONU1 and ONU2 to do anything other than the above.

Figure 6:
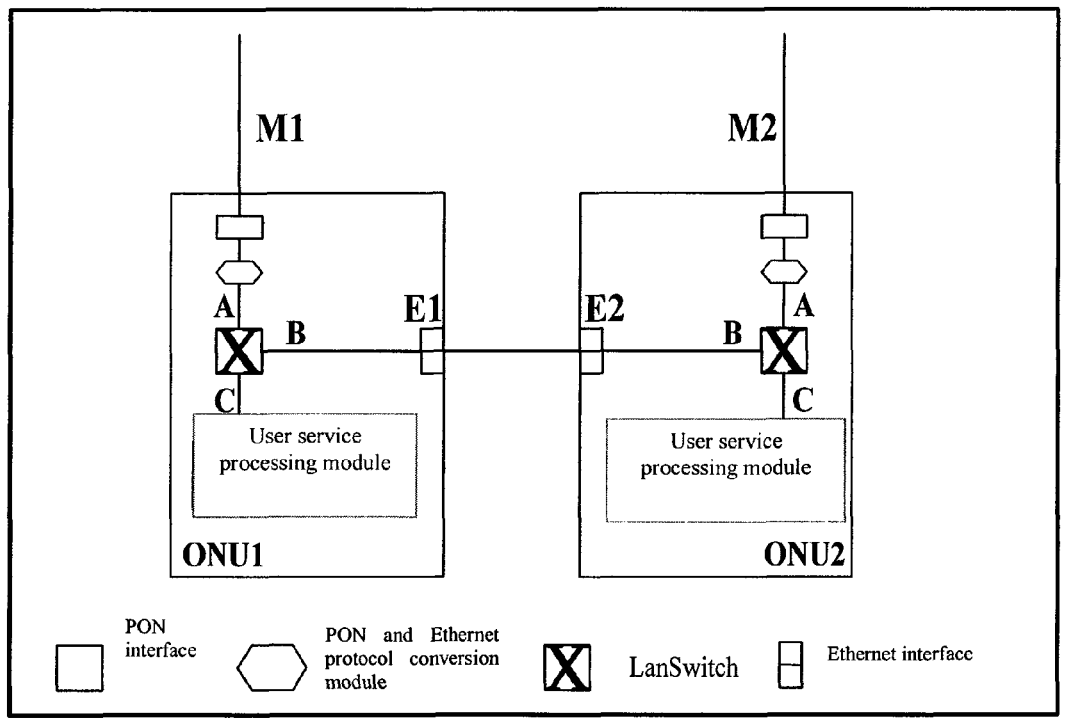
FIG. 6 is a block diagram illustrating the service port switching module of an embodiment of the present disclosure in which the backup link between the ONUs is an Ethernet link.

When the backup link is an Ethernet link:

In this case, the ONU internally adopts another service port switching module, as shown in FIG. 6. The module includes a protocol conversion module and an Ethernet switch. The protocol conversion module is located between the Ethernet switch and the optical network interface and converts between a PON protocol and an Ethernet protocol. The Ethernet switch is connected to a user service processing module, the protocol conversion module, and a backup Ethernet port, and is used to establish the connection between the user service processing module, the protocol conversion module, and the backup Ethernet port through the division of a virtual local area network (VLAN).

When there is a disruption in the branch fiber M1 linking ONU1 and the ODN, ONU1 detects the disrupted link with the OLT, initiates the fault recovery mechanism, and communicates its failure and the need for ONU2 to receive ONU1's data transmission work through the periodical query mechanism. Meanwhile, the OLT also detects the disconnection of ONU1 and alerts ONU2 to work as a backup partner to receive the data transmission work for ONU1. Upon receiving the alert from the OLT, ONU2 responds to ONU1 by agreeing to receive the data transmission work for ONU1. On the Ethernet switch, ONU2 connects port A to port B by dividing the VLAN and establishes a connection between the backup Ethernet port E2 and the PON upstream port to enable data transmission from E2 to the PON upstream port, and reports the connection to the OLT. Upon receiving the response message from ONU2, ONU1 switches the upstream data flow from the PON port to the backup Ethernet port E1, that is, switches from port A on the Ethernet switch to port B by reconfiguring the VLAN. Upon receiving the ONU1 failure alert and alerting ONU2 to receive the data transmission work of ONU1, the OLT adds the bandwidth parameters, which generally include the minimum bandwidth, the maximum bandwidth, and so forth, assigned to ONU1 to those of ONU2 such that the transmission of ONU1 data over ONU2 will not affect ONU2's own services.

In another embodiment, ONU2 may separately assign a logic path over the PON to ONU1 and report the assignment to the OLT. The OLT gives ONU1's original bandwidth parameter values directly to the backup logic path such that the data and bandwidth parameters for ONU1 and ONU2 will not be intermixed or affect each other.

The above embodiments permit ONU2 to transfer the OLT1's data to the OLT so that the services of ONU1 are not disrupted in the event that ONU1 has a disconnection fault or its PON interface module has a failure, without affecting ONU2's own service.

While the present disclosure has been described with reference to preferred embodiments thereof, it will be understood by those ordinary skilled in the art that various modifications and improvements can be made therein without departing from the principles thereof, and all such modifications and improvements should be deemed encompassed within the scope thereof.

What is claimed is:

1. An optical network terminal (ONT) comprising:
   a service port configured to communicate with an Optical Line Terminal (OLT), wherein the service port is configured to support a first bandwidth assigned to the ONT and a second bandwidth assigned to a second ONT;
   a backup port configured to communicate with the second ONT; and
   a switching module in communication with the service port and the backup port,
   wherein the switching module is configured to transfer services between the service port and the backup port,
   wherein the service port receives only the first bandwidth when a failure has not occurred; and
   wherein the service port receives the sum of the first bandwidth and the second bandwidth when the failure occurs.

2. The ONT of claim 1 further comprising a service processing module in communication with the switching module, wherein the switching module is configured to transfer services between the service port, the service processing module, the backup port, or combinations thereof.

3. The ONT of claim 2 wherein the switching module allows the backup port to communicate with the service processing module when communication is lost with the OLT via the service port.

4. The ONT of claim 3 wherein a fault message is sent to the second ONT via the backup port when communication is lost with the OLT via the service port.

5. The ONT of claim 2 wherein the switching module allows the service port to communicate with the backup port when communication is lost between the OLT and the second ONT.

6. The ONT of claim 5 wherein a fault message received from the second ONT, the OLT, or both indicates when communication is lost between the OLT and the second ONT.

7. The ONT of claim 2 wherein the switching module allows the service port, the backup port, and the service processing module to communicate with each other when communication is lost between the OLT and the second ONT.

8. The ONT of claim 1 wherein the switching module is an optical divider.

9. The ONT of claim 1 wherein the switching module does not allow the service port to communicate with the backup port when the second ONT and the service port are in communication with the OLT.

10. The ONT of claim 1 further comprising: a conversion module in communication with the switching module, wherein the conversion module converts between optical services and electrical services.

11. The ONT of claim 10 wherein the conversion module is in communication with the service port, and wherein the switching module is an Ethernet switch.

12. An optical network terminal (ONT) comprising a processor configured to implement a method comprising:
   associating with a second ONT, thereby creating an ONT protection group;
   receiving an increased bandwidth allocation relative to a bandwidth originally assigned to the ONT when a failure occurs;
   receiving services intended for the second ONT; and
   sending the services to the second ONT,
   wherein the increased bandwidth allocation is equal to the sum of the bandwidth originally assigned to the ONT and a second bandwidth assigned to the second ONT.

13. The ONT of claim 12 wherein the method further comprises diagnosing a fault that caused lost communications.

14. The ONT of claim 12 wherein the method further comprises creating a logical path between an Optical Line Terminal (OLT) and the second ONT, thereby separating the services intended for the second ONT from any other services.

15. The ONT of claim 12 wherein the method further comprises receiving a message that indicates the second ONT has lost communications with an Optical Line Terminal (OLT).

16. The ONT of claim 15 wherein the message is received from the second ONT.

17. The ONT of claim 15 wherein the message is received from the OLT.

18. A passive optical network (PON) component comprising a processor configured to implement a method comprising:
   associating a first optical network terminal (ONT) and a second ONT, thereby creating an ONT protection group;
   allocating a first bandwidth to the first ONT;
   allocating a second bandwidth to the second ONT;
   losing communication with the first ONT;
   allocating a third bandwidth to the second ONT responsive to losing communication with the first ONT, wherein the third bandwidth is the sum of the first bandwidth and the second bandwidth; and
   sending data intended for the first ONT to the second ONT.

19. The component of claim 18 wherein the method further comprises sending a fault message to the second ONT.

20. The component of claim 19 wherein the method further comprises directing the second ONT to perform fault diagnosis of the first ONT.

* * * * *